(12) United States Patent
Bonitsky et al.

(10) Patent No.: US 9,784,578 B2
(45) Date of Patent: Oct. 10, 2017

(54) WAKE TEST INSTRUMENTATION

(71) Applicant: LOCKHEED MARTIN CORPORATION, Bethesda, MD (US)

(72) Inventors: David J. Bonitsky, Rosedale, MD (US); David C. Briggs, Edgewood, MD (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 196 days.

(21) Appl. No.: 14/751,928

(22) Filed: Jun. 26, 2015

(65) Prior Publication Data

US 2016/0377461 A1   Dec. 29, 2016

(51) Int. Cl.
*G01C 13/00* (2006.01)
*B63B 9/00* (2006.01)

(52) U.S. Cl.
CPC .............. *G01C 13/00* (2013.01); *B63B 9/00* (2013.01)

(58) Field of Classification Search
CPC .. G01C 13/006; G01C 13/004; G01C 13/002; B63B 49/00; B63C 11/52
USPC ............................ 290/53; 114/276; 73/170.29
See application file for complete search history.

(56) References Cited

U.S. PATENT DOCUMENTS

| 1,571,433 | A | * | 2/1926 | Price | G01F 1/002 200/19.01 |
| 3,740,706 | A | * | 6/1973 | Joseph | H04B 11/00 310/337 |
| 4,881,210 | A | * | 11/1989 | Myers | G10K 11/006 114/244 |
| 5,186,428 | A | * | 2/1993 | Falkenberg | G10K 11/006 248/284.1 |

FOREIGN PATENT DOCUMENTS

| KR | 2013118526 | A | * | 10/2013 |
| KR | 1531491 | B1 | * | 6/2015 |

OTHER PUBLICATIONS

Soloviev et al.; "3D Sonar Measurements in Wakes of Ships of Oppourtunity;" Jan. 2012; Journal of Atmospheric and Oceanic Technology vol. 29; pp. 880-886.*
Reed et al.; "Wake Scale Effects on a Twin-Screw Displacement Ship;" Aug. 1979; Twelfth Symposium: Naval Hydrodynamics; Office of Naval Research; pp. 225-233.*
Phelps et al.; "Full Scale Wake and boundary layer Instrumentation feasiblity Study;" 1980; Pergamon Press Ltd.; Ocean Engng. vol. 7, pp. 281-304.*

* cited by examiner

*Primary Examiner* — Daniel J Colilla
(74) *Attorney, Agent, or Firm* — Kent E. Kemeny; Andrew M. Calderon; Roberts Mlotkowski Safran Cole & Calderon P.C.

(57) ABSTRACT

A wake test instrumentation and more particularly, systems and methods for determining wake velocities and directions are provided. The wake test instrument includes a linkage system mounted to a base and a pole pivotally mounted to the linkage system and which comprises a hydrofoil system. The wake test instrument further includes a hydrofoil system mounted to the pole. The wake test instrument further includes a water flow meter mounted to the pole which is structured to measure wake parameters.

20 Claims, 4 Drawing Sheets

WAKE TEST INSTRUMENTATION

FIELD OF THE INVENTION

The invention is directed to wake test instrumentation. More particularly, the invention is directed to systems and methods for determining wake velocities and directions.

BACKGROUND DESCRIPTION

The wake created by a ship and its propulsion may affect the ability to execute activities behind or next to a ship such as rescue operations, e.g., recovery of life boats, etc. For example, the wake of a ship can greatly influence recovery location based on where the wake has the least impact on the object and recovery ship speed for each recovered object. This is especially true in launch and recovery where the wake greatly affects the movement of the object within the water and can make recovering the object extremely difficult.

More specifically, the wake created by a ship and its propulsion may affect the ability to execute activities required behind or next to the ship. That is, a wake of a ship can move the object within the water, making it difficult to determine or anticipate a precise location of the object in the water to effectuate effective recovery operations. The wake created by larger ships can be quite significant and makes activities behind the ship even more difficult.

SUMMARY OF THE INVENTION

In an aspect of the invention, a wake test instrument comprises a linkage system mounted to a base and a pole pivotally mounted to the linkage system. The wake test instrument further comprises a pole pivotally mounted to the linkage system and which comprises a hydrofoil system. The wake test instrument further comprises a water flow meter mounted to the pole which is structured to measure wake parameters.

In yet another aspect of the invention, a wake test instrument comprises: a four bar linkage system mounted to a base; a pole pivotally mounted to two bars of the four bar linkage system such that the pole remains in a substantially vertical orientation in a lowered position and raised position; a plurality of hydrofoils rotatably mounted to the pole; and a water flow meter mounted to the pole which is structured to measure wake parameters.

In still yet another aspect of the invention, a wake test instrument comprises: a first set of parallel bars pivotally mounted to a second set of parallel bars forming a closed loop system; a pole forming a part of the second set of parallel bars, which is pivotally mounted to end of the first set of parallel bars such that the pole remains in a substantially vertical orientation in a lowered position and raised position; a plurality of hydrofoils rotatably mounted to the pole such that they swivel along a longitudinal axis of the pole; a water flow meter mounted to the pole which is structured to measure wake parameters; a winch system structured to raise and lower the pole; a locking system mounted to an upright bar of the second set of parallel bars, the locking system comprising two plates with a plurality of aligned pin holes and a bar of the first set of parallel bars includes a hole which aligns with the plurality of aligned pin holes at different height positions such that a pin is insertable therethrough at different raised and lowered positions of the pole; and a dampening system mounted to the pole.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to ship wake test instrumentation. More particularly, the invention is directed to systems and methods for determining wake velocities of different vessels at different sea depths. In embodiments, the systems and methods can be used to model wake parameters at different depths and sea conditions for different vessels. Advantageously, the wake velocity and directions can be used in simulations as well as calculation to see how a model of an object within the water will react to the wake.

In embodiments, the system includes, for example, a test device attached to the deck of a vessel, which extends into the water behind another vessel in order to measure parameters of a wake at different depths and different locations with respect to the vessel. In alternative embodiments, the test device can be mounted to the deck of the vessel which is creating the wake in order measure parameters of the wake at different depths and different locations with respect to the vessel. Accordingly, the test device allows for direct measurement of the wake in a sea environment at multiple depths and locations. The test device can be used behind any vessel with relative ease and can be integrated into rigid-hulled inflatable boats or other vessels that have adequate space on the deck.

In embodiments, the test device, e.g., wake measurement device, can measure the wake caused by the vessel and its propulsion at different depths and different locations, providing a very useful tool for use in launch and recovery operations, e.g., determine the wake expected at recovery speed thus allowing for better preparedness or change how to recover an object by changing the pickup location, speed, depth, etc. For example, by using the test device described herein, launch and recovery operations can use improved data to know the best recovery location based on where the wake has the least impact on the object and recovery ship speed for each recovered object.

In further embodiments, the test device can be important to any company that designs, builds or uses ships that need recovery capabilities or has concerns that involve a vessel's wake. For example, the test device has application and interest for organizations that use it to create wake standards. Moreover, the test device can obtain useful data for the makers of launched devices in order to better program the stability to the expected wake behind a given vessel. The test device could also have practical uses for standard boats or fishing vessels that may use objects (nets) in tow or have other wake concerns.

Figure 1:
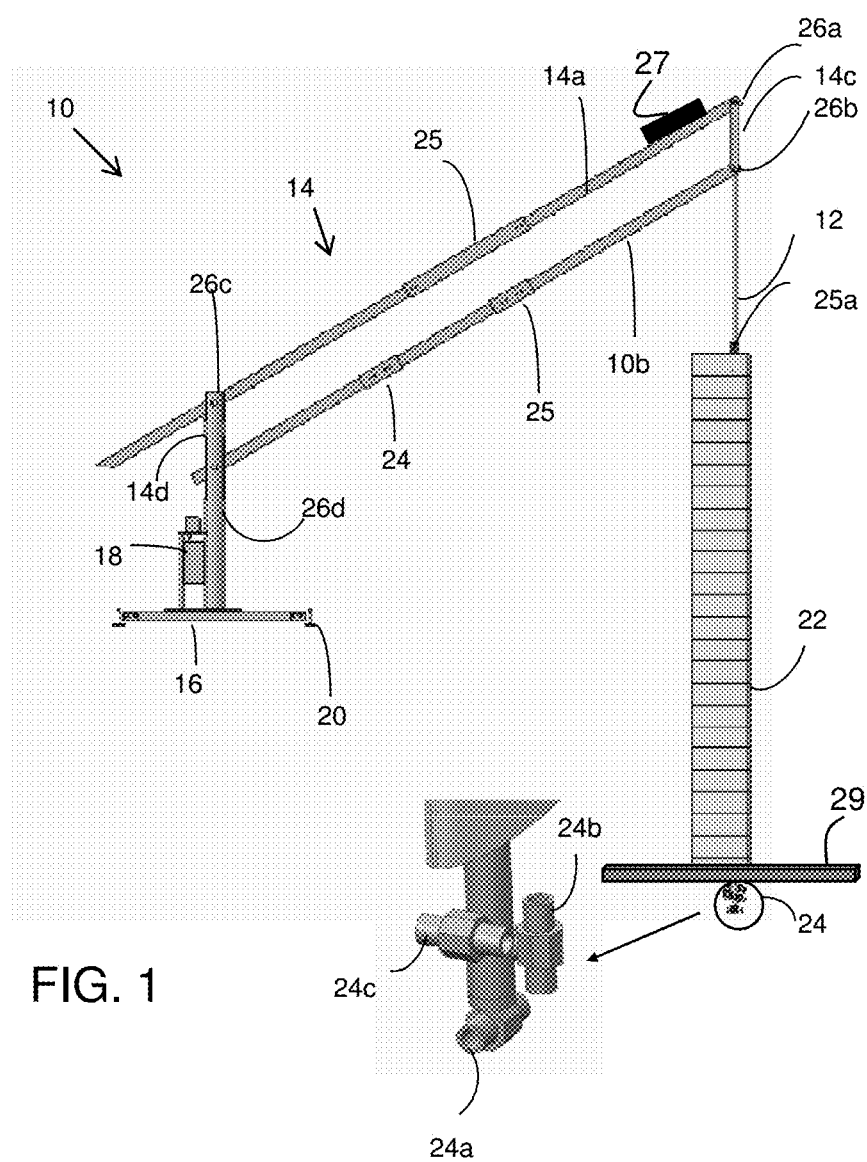
FIG. 1 shows a ship wake test instrument in accordance with aspects of the invention.

FIG. 1 shows a wake test instrument in accordance with aspects of the invention. In embodiments, the wake test instrument 10 includes a pole 12 pivotally mounted to a linkage system 14 which, in turn, is mounted to a base 16. In embodiments, the pole 12 forms part of the linkage system 14 as described further herein. In embodiments, the base 16 can be made of tubes welded to a plate for accommodating a winch system 18 described in more detail herein. The base 16 can include adjustable feet 20 to level the base 16 and to maintain a vertical orientation of a hydrofoil system 22.

In embodiments, the linkage system 14 includes a parallel bar linkage system. In an illustrative embodiment, the parallel bar linkage system can be a four bar linkage system 14 comprising bars or links 14a, 14b, 14c and 14d, forming a movable closed chain linkage. The links or bars can be 3"×3" square tubing, as an example, although other configurations are also contemplated by the present invention. A portion of the bar or link 14d can be an upright bar extending to a base 16 and mounted directly thereon; whereas, the bar or link 14c comprises a portion of the pole 12. In additional embodiments, the links or bars 14a, 14b can each comprise two or more separate bars joined together by one or more collars 25. In this way, each of the links or bars 14a, 14b can be broken down into smaller components for storage and/or transport and/or different applications.

In embodiments, the links or bars 14a, 14b, 14c and 14d are connected in a loop by joints or hinges 26a, 26b, 26c and 26d. The joints or hinges 26a, 26b, 26c and 26d are configured so the links 14a, 14b and 14c, 14d, respectively, move in parallel planes. In embodiments, the pole 12 can be hinge mounted to hinges 26a, 26b. In this configuration, the linkage system 14 can raise and lower the pole 12 thereby allowing changes of depth within the water, while maintaining a vertical orientation of the hydrofoils 22 provided on the pole 12.

Still referring to FIG. 1, in embodiments, the pole 12 can be approximately 18 feet in length and two inches in diameter; although other dimensions are contemplated by the present invention. For example, in embodiments, the length of the pole 12 can be any length which allows the pole 12 to be submerged into the water (by use linkage system 14) to a depth of about 12 feet. The material of the pole 12 can be any material that can withstand stresses (loads) placed on the pole when inserted into the water behind a wake of a vessel. In preferred embodiments, the pole 12 is made of aluminum or other corrosion resistant material. In further embodiments, the pole 12 can be multiple poles which are connected together by one or more collars 25a. In embodiments, the collars 25a provide added strength to the pole 12.

FIG. 1 further shows multiple hydrofoils 22 rotatably attached to the pole 12. In embodiments, the multiple hydrofoils 22 are aerodynamically designed in order to reduce any stress (loads) placed on the pole 12 when submerged into the water behind a vessel's wake. In addition, the multiple hydrofoils 22 can be rotatably (swivel) mounted to the pole 12 in order to ensure a proper orientation with respect to a vessel's wake regardless of the location of the pole 12 with respect to the wake, as well as to ensure that the multiple hydrofoils 22 are aligned to the overall flow of the vessel's wake to reduce stress (loads) placed on the pole 12. In embodiments, each of the hydrofoils 22 can be separately rotatably mounted to the pole 12 or groups of the hydrofoils can be rotatably mounted to the pole 12 such that they swivel about the pole along is longitudinal axis. In further embodiments, the hydrofoils 22 can be fixedly attached to the pole 22. In still additional embodiments, the hydrofoils 22 can be part of the pole, e.g., integral with the pole design itself.

An Inertial Measurement Unit (IMU) 27 can be mounted to the pole 12. In embodiments, the IMU 27 comprises a set of gyroscopes and accelerometers that can measure direction in all three directions as well as all three angular directions. By using the IMU 27 it is possible to see how the position of the top of the pole 12 changes in the x, y, and z directions. In this way, the IMU 27 can be used to determine any vertical movement in the pole 12, which can then be eliminated in the data later. Accordingly, the IMU 27 can help eliminate noise from bouncing and give an accurate location of the pole 12.

FIG. 1 further shows a multidirectional flow measurement device 24 at an end of the pole 12, remote from the linkage system 14. In embodiments, the multidirectional flow measurement device 24 includes three flow meters 24a, 24b, 24c provided in the x-axis, y-axis and z-axis, respectively. In embodiments, the three flow meters 24a, 24b, 24c can be turbine flow meters which record flow rates of a wake. More specifically, the multidirectional flow measurement device 24, when submerged into the water behind a vessel or at other locations with respect to the wake, e.g., within a wake of a vessel, will take multidirectional flow measurements simultaneously.

In embodiments, the multidirectional flow measurement device 24 and more specifically the flow meters 24a, 24b, 24c can measure the flow rate of the wake behind or at other relative locations of the vessel in gallons per minute or other volume over time measurement. The flow rate, e.g., gallons per minute, of each of the flow meters, 24a, 24b, 24c can then be calculated into a velocity measurement by known calculations. Moreover, the flow rates of each of the flow meters 24a, 24b, 24c can be compared to each other to create a force vector which is the sum of the three flow meters 24a, 24b, 24c. In alternative embodiments, each of the vectors (x,y,z) can remain separate, such that each of the force vectors from the three flow meters 24a, 24b, 24c can be compared to each other.

By taking such measurements at different locations and depths, it is now possible to create a grid of velocities and map these velocities for different vessels, with different designs/propulsion systems at different sea conditions. For example, knowing the following variables and measurements, it is possible to provide a model of wakes for different vessels:

(i) hull and propulsion system design;
(ii) velocity of the vessel;
(iii) sea conditions (e.g., calm vs. turbulent);
(iv) location of the multidirectional flow measurement device 24 with respect to both the vessel which is creating the wake and the wake itself;
(v) depth of the multidirectional flow measurement device 24; and
(vi) velocity (flow rate) and direction (velocity vector) of the flow of water within the wake.

In optional embodiments, FIG. 1 further shows one or more horizontal foils 29 mounted at different locations on the pole 12. In more specific embodiments, a plurality of foils (e.g., three) 29 can be mounted to a bottom of the pole 12. The horizontal foils 29 are preferably perpendicular to the hydrofoils 22 so that fluid (e.g., water) would flow over and below them in order to dampen any bouncing of the pole 12. In addition, the horizontal foils 29 are designed to provide a downward force on the system in order to further stabilize the pole 12. As a further alternative or additional approach, the horizontal foils 29 can also represent a damper (suspension) between the center pole and bottom link.

Figure 2A:
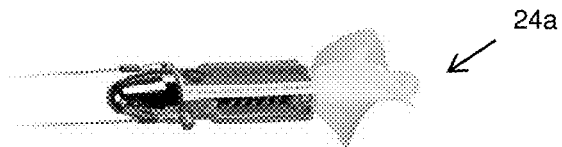
FIGS. 2a-2e show various different flow measurement devices that can be implemented in accordance with aspects of the present invention.
Figure 2B:
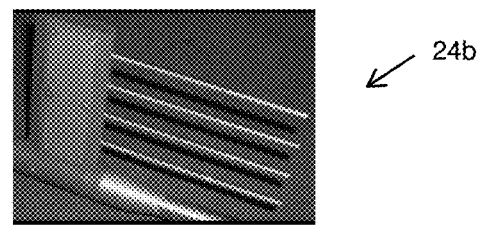
Figure 2C:
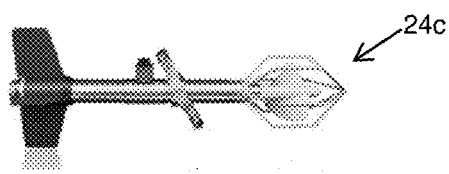
Figure 2D:
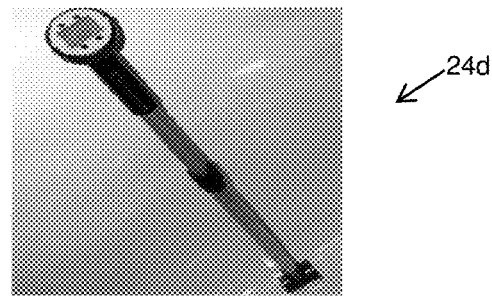
Figure 2E:
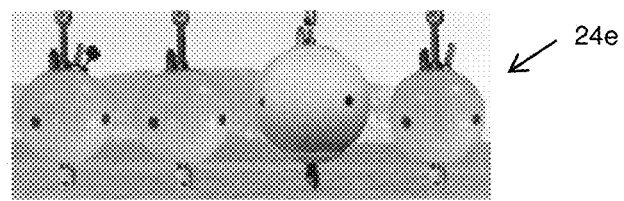

FIGS. 2a-2e show different flow measurement devices that can be implemented in accordance with aspects of the present invention, e.g., attached to the pole 24 and submerged into the water to measure wake parameters. It should be understood by those of skill in the art that the different flow measurement devices described herein are for illustrative purposes only, and that other flow measurement devices are also contemplated herein. Accordingly, the different flow measurement devices described herein should not be considered limiting examples. For example, FIG. 2a shows a mechanical flowmeter 24a. In this implementation, a number of rotations of the fin can be translated into a velocity measurement. In FIG. 2b, rotating pitot tubes 24b can be used as the flow measurement device. In FIG. 2c, a current meter 24c can be used to measure water speeds. In FIG. 2d, a flow probe 24d can be used as the flow measurement device; whereas, in FIG. 2e, a plurality of current meters 24e can be used to measure the wake parameter at locations relative to a wake of a vessel.

Figures 3, 4:
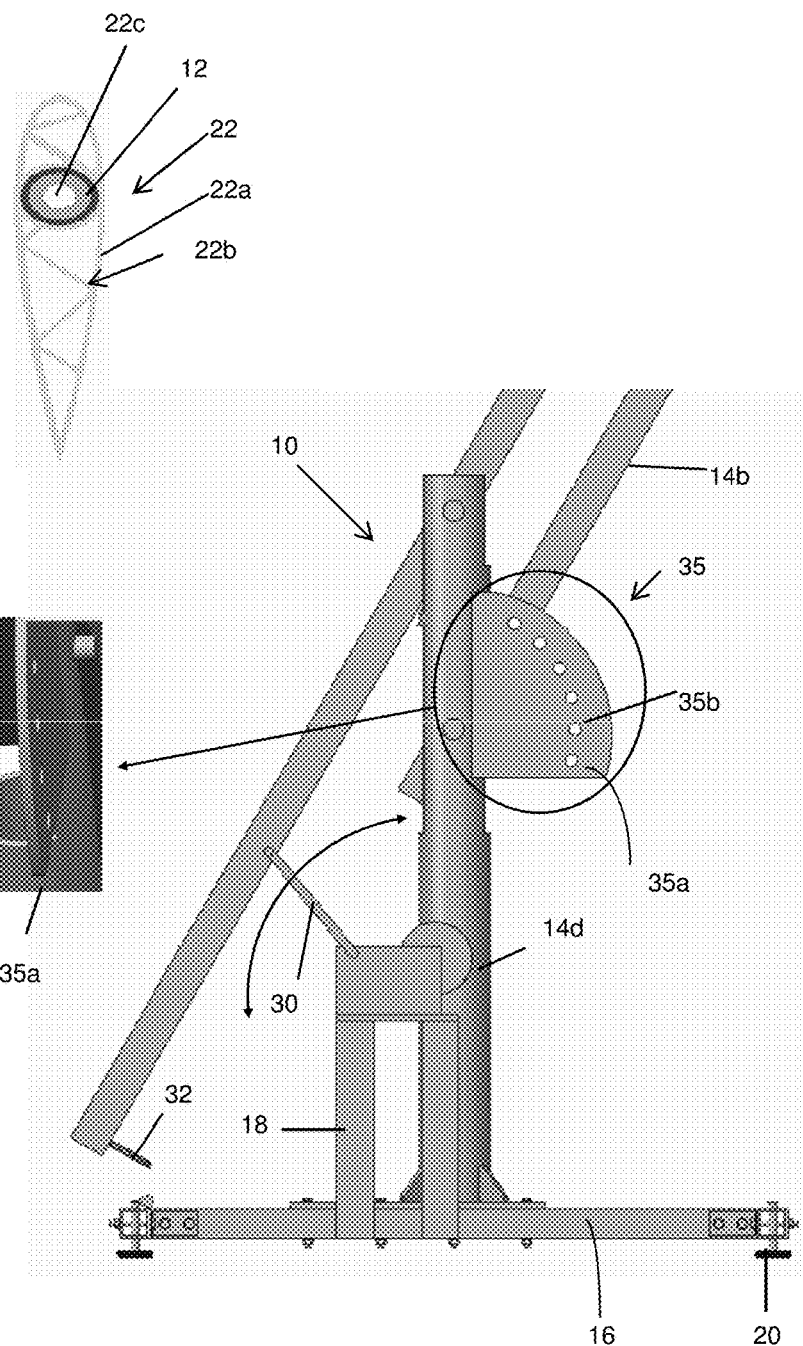
FIG. 3 shows a cross sectional view of a hydrofoil in accordance with aspects of the invention.
FIG. 4 shows an exploded view of the wake test instrument in accordance with aspects of the invention.

FIG. 3 shows a cross sectional view of a hydrofoil 22 in accordance with aspects of the invention. In embodiments, the hydrofoil 22 includes a foam body with fiberglass coating as represented at reference numeral 22a. In embodiments, the foam body with fiberglass coating 22a is designed to reduce water drag. In alternative embodiments, the hydrofoils 22 could also be made of metal (e.g., aluminum) or a plastic material. The hydrofoil 22 also includes a substantially hollow interior with a frame structure 22b to decrease weight and to maintain buoyancy within the water. An opening 22c is also provided to accommodate the pole 12. The hydrofoils 22 and more specifically the opening 22c is watertight in order to house the sensors associated with the flow measurement devices. In embodiments, the hydrofoils 22 are also shaped as a wing (e.g., airplane wing) in order to reduce drag and, hence, reduce stresses (loads) that are placed on the pole 12 when it is submerged in the water. FIG. 4 shows an exploded view of the wake test instrument 10 in accordance with aspects of the invention. In particular, FIG. 4 shows the winch system 18 and a locking mechanism 35. In embodiments, the winch system 18 is mounted to the base 16, and includes a handle 30 which can be rotated to lower or raise the pole 12 (not shown), via the linkage system 14. The wake test instrument 10 also includes a locking pin or hook 32 which can lock the wake test instrument 10 in the raised positioned. By using the winch system 18, the depth of the sensors (e.g., flow measurement device) can be varied from the surface of the water down to 12 feet deep or more in order to take water flow readings.

Moreover, the wake test instrument 10 includes a locking mechanism 35, mounted to the upright bar 14d. In embodiments, the locking mechanism 35 includes opposing plates 35a on each side of the upright bar 14d, each of which includes a plurality of pin holes 35b. In embodiments, the pin holes 35b are equidistance from center point "X" and are separated by approximately 15°; although other angles and configurations are contemplated herein. In addition, the bar 14b is positioned and movable between the plates 35a and also includes a hole which aligns with each of the pin holes 35b at different raised and lowered positions of the linkage system 14. In this way, the linkage system 14 can be locked to the locking mechanism 35 at different heights by inserting a pin through the pin holes 35b and the hole of the bar 14b at different raised or lowered positions. The lowest angle of the linkage system 14 can be approximately −15°; although other angles are also contemplated by the present invention.

Figure 5:
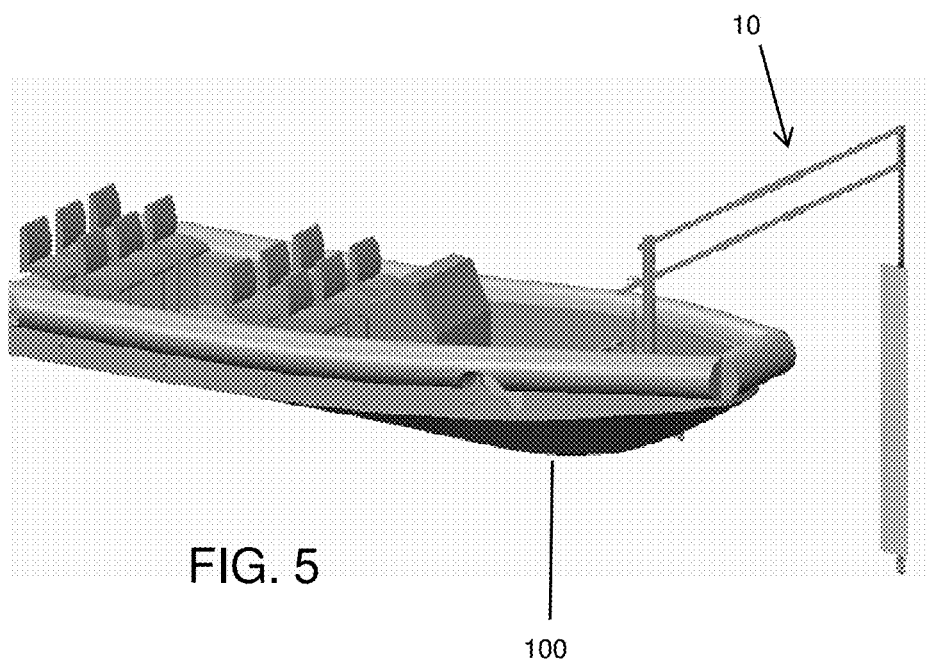
FIG. 5 shows the wake test instrument mounted to a vessel in accordance with aspects of the invention.

FIG. 5 shows the wake test instrument 10 mounted to a vessel 100 in accordance with aspects of the invention. In embodiments, the wake test instrument 10 can be mounted to a bow of a vessel 100, which follows another vessel to measure its wake parameters. In alternate implementations, the wake test instrument 10 can be mounted to a rear (stern) of a vessel that is creating the wake. In either case, by lowering the wake test instrument 10 into the water, it is possible to take flow readings and translate these flow readings into velocity and force vector of the water flow of the wake.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A wake test instrument, comprising:
   a linkage system mounted to a base;
   a pole pivotally mounted to the linkage system and which comprises a hydrofoil system; and
   a water flow meter mounted to the pole which is structured to measure wake parameters.

2. The wake test instrument of claim 1, wherein the base includes adjustable feet.

3. The wake test instrument of claim 1, wherein the linkage system is a four bar linkage system, wherein one bar of the four bar linkage system comprises a portion of the pole which is hinge mounted to two parallel bars of the linkage system such that the pole remains in a substantially vertical orientation in a lowered position and raised position.

4. The wake test instrument of claim 3, further comprising an inertial measurement unit mounted to the pole.

5. The wake test instrument of claim 3, wherein the hydrofoil system is a plurality of hydrofoils rotatably mounted to the pole.

6. The wake test instrument of claim 1, wherein the hydrofoil system includes a plurality of hydrofoils each of which are hollow, and which are mounted to the pole such that they swivel along a longitudinal axis of the pole.

7. The wake test instrument of claim 1, wherein the hydrofoil system includes a plurality of hydrofoils at least one of which includes a watertight compartment.

8. The wake test instrument of claim 1, further comprising a means such as winch or hydraulic actuator mounted to the base and which is structured to raise and lower the pole.

9. The wake test instrument of claim 1, further comprising a locking system mounted to an upright bar of the linkage system, the locking system comprising a plurality of pin holes aligning with a hole of another bar of the linkage system such that a pin can be inserted through the pin holes and the hole when in alignment.

10. The wake test instrument of claim 1, wherein the wake test instrument is mounted to a vessel that is towed or powered behind the vessel whose wake is to be measured.

11. The wake test instrument of claim 1, further comprising a dampening system mounted to the pole.

12. A wake test instrument, comprising:
a four bar linkage system mounted to a base;
a pole pivotally mounted to two bars of the four bar linkage system such that the pole remains in a substantially vertical orientation in a lowered position and raised position;
a plurality of hydrofoils rotatably mounted to the pole; and
a water flow meter mounted to the pole which is structured to measure wake parameters.

13. The wake test instrument of claim 12, wherein the base includes adjustable feet.

14. The wake test instrument of claim 12, wherein the hydrofoils are hollow, include a watertight compartment, and are mounted to the pole such that they swivel along a longitudinal axis of the pole.

15. The wake test instrument of claim 12, further comprising an inertial measurement unit mounted to the pole.

16. The wake test instrument of claim 12, further comprising a dampening system mounted to the pole.

17. The wake test instrument of claim 12, further comprising a winch system which is structured to raise and lower the pole via the four bar linkage system.

18. The wake test instrument of claim 12, further comprising a locking system mounted to an upright bar of the four bar linkage system, the locking system comprising two plates with a plurality of aligned pin holes and a bar of the four linkage system includes a hole which aligns with the plurality of aligned pin holes at different height positions such that a pin is insertable therethrough at different raised and lowered positions.

19. The wake test instrument of claim 12, wherein the pole is multiple poles connected together by a collar.

20. A wake test instrument, comprising:
a first set of parallel bars pivotally mounted to a second set of parallel bars forming a closed loop system;
a pole forming a part of the second set of parallel bars, which is pivotally mounted to end of the first set of parallel bars such that the pole remains in a substantially vertical orientation in a lowered position and raised position;
a plurality of hydrofoils rotatably mounted to the pole such that they swivel along a longitudinal axis of the pole;
a water flow meter mounted to the pole which is structured to measure wake parameters;
a winch system structured to raise and lower the pole;
a locking system mounted to an upright bar of the second set of parallel bars, the locking system comprising two plates with a plurality of aligned pin holes and a bar of the first set of parallel bars includes a hole which aligns with the plurality of aligned pin holes at different height positions such that a pin is insertable therethrough at different raised and lowered positions of the pole; and
a dampening system mounted to the pole.

* * * * *